(12) United States Patent
Cui et al.

(10) Patent No.: US 12,281,034 B2
(45) Date of Patent: Apr. 22, 2025

(54) ELECTROACTIVE BIO-CARRIER MODULE AND SEWAGE TREATMENT DEVICE WITH SAME

(71) Applicant: Beijing University of Technology, Beijing (CN)

(72) Inventors: Dan Cui, Beijing (CN); Kewen Wang, Beijing (CN); Yiming Liu, Beijing (CN); Aihong Chen, Beijing (CN)

(73) Assignee: Beijing University of Technology, Beijing (CN)

( * ) Notice: Subject to any disclaimer, the term of this patent is extended or adjusted under 35 U.S.C. 154(b) by 424 days.

(21) Appl. No.: 17/756,783

(22) PCT Filed: Oct. 14, 2021

(86) PCT No.: PCT/CN2021/123691
§ 371 (c)(1),
(2) Date: Jun. 2, 2022

(87) PCT Pub. No.: WO2022/166247
PCT Pub. Date: Aug. 11, 2022

(65) Prior Publication Data
US 2023/0159360 A1    May 25, 2023

(30) Foreign Application Priority Data
Feb. 8, 2021  (CN) .......................... 202110173450.0

(51) Int. Cl.
*C02F 3/00* (2023.01)
*C02F 3/28* (2023.01)
*C02F 101/30* (2006.01)

(52) U.S. Cl.
CPC ............ *C02F 3/005* (2013.01); *C02F 3/2846* (2013.01); *C02F 2101/30* (2013.01); *C02F 2201/46105* (2013.01); *C02F 2203/006* (2013.01)

(58) Field of Classification Search
None
See application file for complete search history.

(56) References Cited

U.S. PATENT DOCUMENTS 4,085,173 A * 4/1978 Lomax, Jr. ................ F02K 9/24
86/20.12
2013/0302703 A1* 11/2013 Bretschger .............. H01M 8/16
429/401
(Continued)

FOREIGN PATENT DOCUMENTS

CN        106976955 A     7/2017
CN        112142267 A     12/2020
(Continued)

OTHER PUBLICATIONS

International Search Report PCT/CN2021/123691, mailed Jan. 17, 2022.
(Continued)

*Primary Examiner* — Chester T Barry
(74) *Attorney, Agent, or Firm* — Karen M. Hahn

(57) ABSTRACT

An electroactive bio-carrier module and a sewage treatment device using same are provided, which relate to the field of bioelectrochemistry and sewage treatment. The electroactive bio-carrier module is composed of an anode module and a cathode module made of a conductive material. The anode module is formed by connecting carbon fiber brushes in series and is of a vertically ring type structure; the cathode module is formed by connecting stainless steel meshes in series; the stainless steel meshes are in a folded horizontal stacked design; the anode and cathode modules are con-
(Continued)

nected through an external lead wire to form a circuit. Surfaces of the anode and cathode modules can both enrich microorganisms, biofilms are formed on the surfaces. The electrode module is arranged in an up-flow type sewage treatment device and is used as an electroactive bio-carrier, to form a hybrid sewage treatment device with a built-in electroactive bio-carrier.

11 Claims, 4 Drawing Sheets

(56) References Cited

U.S. PATENT DOCUMENTS

2020/0131650 A1    4/2020   Kumar et al.
2021/0340039 A1*  11/2021  Moreau .................... C25B 9/63

FOREIGN PATENT DOCUMENTS

| CN | 112250163 A | 1/2021 |
| CN | 113213624 A | 8/2021 |

OTHER PUBLICATIONS

Chinese Patent Application 202110173450.0 First Office Action, Aug. 19, 2022.
Chinese Patent Application 202110173450.0 Second Office Action, Dec. 1, 2022.

* cited by examiner

ELECTROACTIVE BIO-CARRIER MODULE AND SEWAGE TREATMENT DEVICE WITH SAME

CROSS-REFERENCE TO RELATED APPLICATIONS

This application is a national stage application of International Patent Application No. PCT/CN2021/123691, filed on Oct. 14, 2021, which claims priority of the Chinese Patent Application No. 202110173450.0, filed on Feb. 8, 2021, all of which are incorporated by references in their entireties.

TECHNICAL FIELD

The present disclosure relates to the field of bioelectrochemistry and sewage treatment, and specifically to an electroactive biocarrier module and a sewage treatment device with the same.

BACKGROUND ART

Anaerobic biological process is a method that degrades organic pollutants in sewage and generate methane, carbon dioxide, and other substances by the combined action of facultative anaerobes, obligate anaerobes, and other microorganisms. Due to the advantages including low cost, good effect, green and environmental friendly, et al., this method has become a mainstream process for real sewage treatment at present. However, there are also certain shortcomings, such as, slow treatment speed, long starting time, large structure volume, which greatly restrains the development of the anaerobic biological method. The application of bio-carriers can greatly improve the efficiency of the anaerobic biological process. In the traditional anaerobic biological treatment process, bio-carriers are introduced to enrich the microorganisms. A larger specific surface area and surface properties suitable for biological attachment provide a bioreactor with larger biomass and biological reaction sites; and at the same time, studies have proved that the bio-carriers can re-distribute air and water by their own structures, thereby improving the removal effect on the pollutants.

In order to further improve the treatment efficiency of the anaerobic biological process and accelerate the reaction, the present disclosure proposes an electrode bio-carrier with a three-dimensional configuration, and a hybrid anaerobic process device is constructed. Through introducing a micro electric field, electroactive microorganisms are directionally enriched on the surface of the electrode bio-carrier, which not only plays a fixing role, but also increases the biomass. The treatment speed of the anaerobic biological process is increased through electric potential regulation and electroactive microbial catalysis. Although the introduction of the electrode bio-carriers can effectively overcome the disadvantages of slow anaerobic biological treatment, to apply this process to the anaerobic process of real sewage treatment, it is necessary to solve the problems of increased resistance and decreased performance after scaling up. Existing studies have proved that with the scaling up, the voltage loss is more obviously under the influence of an internal resistance of an electrode material and an average current density; and at the same time, it is also necessary to consider the configuration of an electrode from the perspective of fluid mechanics. A good flow pattern can provide appropriate biological film growth, strength, activity, and effective use of the volume of a reactor, and is conducive to the mass transfer process of pollutants, so as to ultimately achieve the purpose of enhancing the process efficiency.

The present disclosure provides an electroactive bio-carrier module, and a hybrid anaerobic biological process device is constructed to strengthen sewage treatment. The design of a bio-carrier module configuration is mainly based on the principle of enhancing solution mixing and extending the retention time of a substance. The retention time distribution of the hybrid process is analyzed through a tracer experiment, and the computational fluid dynamics simulation (CFD) is used to evaluate optimal contributions of the electroactive bio-carriers to the flow state of fluid and the process efficiency.

SUMMARY

The present disclosure aims to provide an electroactive bio-carrier module and a sewage treatment device with the same. The present disclosure has the effects of increasing the biomass, improving the hydraulic flow state, and improving the sewage treatment efficiency.

In one aspect of the present disclosure, two electroactive bio-carrier modules are provided, each of which includes:

(1) a ring type carbon brush electrode bio-carrier module,
the cylindrical carbon brush electrode bio-carrier module is formed by combining a plurality (preferably 9) of carbon brushes; each carbon brush having a diameter of 1.5-3.0 cm and a length of 10-30 cm;
the carbon brushes are soaked in hydrochloric acid with a preferable hydrochloric acid concentration of 1 mol/L for 24 h and then dried in air after impurities are removed from the surfaces of the carbon brushes; a first titanium wire and plastic screws are used to connect the plurality of carbon brushes treated in series to the first titanium wire at an interval of 20-50 mm; one end, i.e. an upper end, of each carbon brush is fixed to the first titanium wire; the first titanium wire is enclosed end to end to form a ring; one carbon brush is fixed at a center of the ring; the ring type carbon brush electrode bio-carrier module in whole is of a cylindrical structure formed by the carbon brushes axially disposed in parallel; preferably, the cylinder has a diameter of 8 cm and a height of 16 cm;

(2) a corrugated stainless steel mesh electrode bio-carrier module
the corrugated stainless steel mesh electrode bio-carrier module is formed by combining a plurality (preferably 8) of corrugated stainless steel meshes stacked in parallel; lengthwise directions of corrugations of adjacent upper and lower corrugated stainless steel meshes are perpendicular to each other; one layer and another layer of the adjacent upper and lower corrugated stainless steel meshes are fixedly connected by a second titanium wire; preferably, an included angle at a wave crest or a wave trough of each corrugated stainless steel mesh is 60 degrees; and a distance between two adjacent wave crests or wave troughs is 2 cm.

In another aspect of the present disclosure, a process device with built-in electroactive bio-carrier modules is provided. A main body of the device is formed by axially connecting one cone and six cylinders in series; the cone is located at a bottom of the main body; the main body is made of an insulating material; from top to bottom, a first cylinder of the six cylinders is provided with a three-phase separator and a water outlet; a second cylinder of the six cylinders is filled with the ring type carbon brush electrode bio-carrier module as an anode module; a third cylinder of the six cylinders is filled with the corrugated stainless steel mesh electrode bio-carrier module as a cathode module; the cathode module and the anode module are connected with an external power supply, an external resistor, and a data acquisition machine (used for collecting current, not shown in the figure) to form a loop; in an operation process, an external voltage can be applied or not; the fifth cylinder of the six cylinders, the sixth cylinder of six cylinders, and the cone at the bottom form an anaerobic sludge area which is provided with a water inlet.

The carbon fiber brushes and the stainless steel meshes may be connected in series via a third titanium wire, and the third titanium wire may be configured as a current collector.

Each stainless steel mesh may be made of a 304 stainless steel mesh material of 24 meshes.

Surfaces of the anode module and the cathode module may enrich electroactive bio-films.

No voltage may be applied to the module or an external voltage less than 1 V may be applied to the module.

The device may be in an up-flow design, and the anode module and the cathode module may be arranged one-above-another in the device.

The cone and the cylinders may be of non-conductive materials, such as organic glass, polytetrafluoroethylene.

Secondary water distribution may be performed by the anode module and the cathode module, and the actual hydraulic retention time is prolonged.

The constructed sewage treatment process can be widely used for various kinds of sewage, including urban domestic wastewater, high-concentration organic wastewater, refractory industrial wastewater, and the like.

The device may be in an anaerobic biological process, and may be in a sealed design.

Beneficial effects:
Compared to an existing module and a process method, the present disclosure has the following advantages:
(1) the electroactive bio-carrier module of the present disclosure can not only play a role of secondary water distribution, but also prolong a hydraulic path and improve the hydraulic flow state;
(2) the electroactive bio-carrier of the present disclosure can directionally enrich the electroactive bio-films under the action of a micro electric field; and
(3) in the sewage treatment device with the built-in electroactive bio-carrier of the present disclosure, the anaerobic biological reaction and the bioelectrochemical reaction are generated simultaneously so as to play a role of enhancing the removal of the pollution.

BRIEF DESCRIPTION OF THE DRAWINGS

FIG. 1 is a structural diagram of a ring type carbon brush electrode bio-carrier; in which

FIG. 2 is a schematic diagram of a corrugated stainless steel mesh electrode bio-carrier module; in which

DETAILED DESCRIPTION OF THE EMBODIMENTS

The present disclosure will be further described below in detail in combination with specific embodiments and with reference to the accompanying drawings.

Embodiment 1

In an embodiment of the present disclosure, cylinders used for constructing the device each have an inner diameter of 12 cm, a wall thickness of 1 cm, and a height of 20 cm. The device has an overall height of 135 cm in FIG. 3.

Figure 1A:
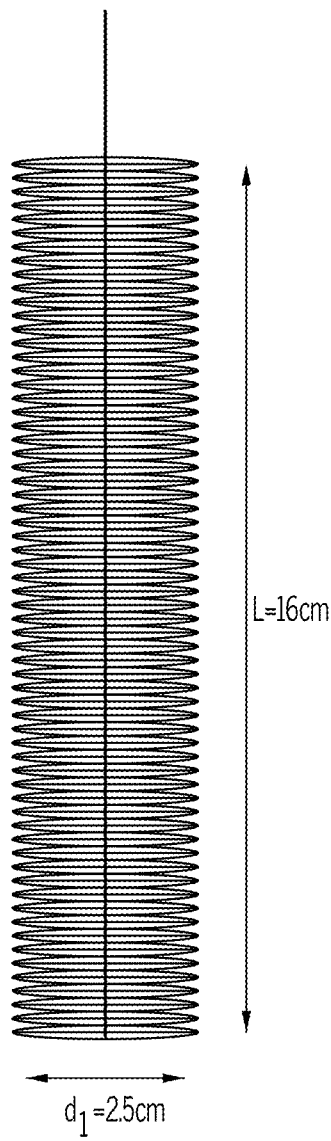
FIG. 1A is a schematic structural diagram of a single carbon brush of an embodiment of the present disclosure.
Figure 1B:
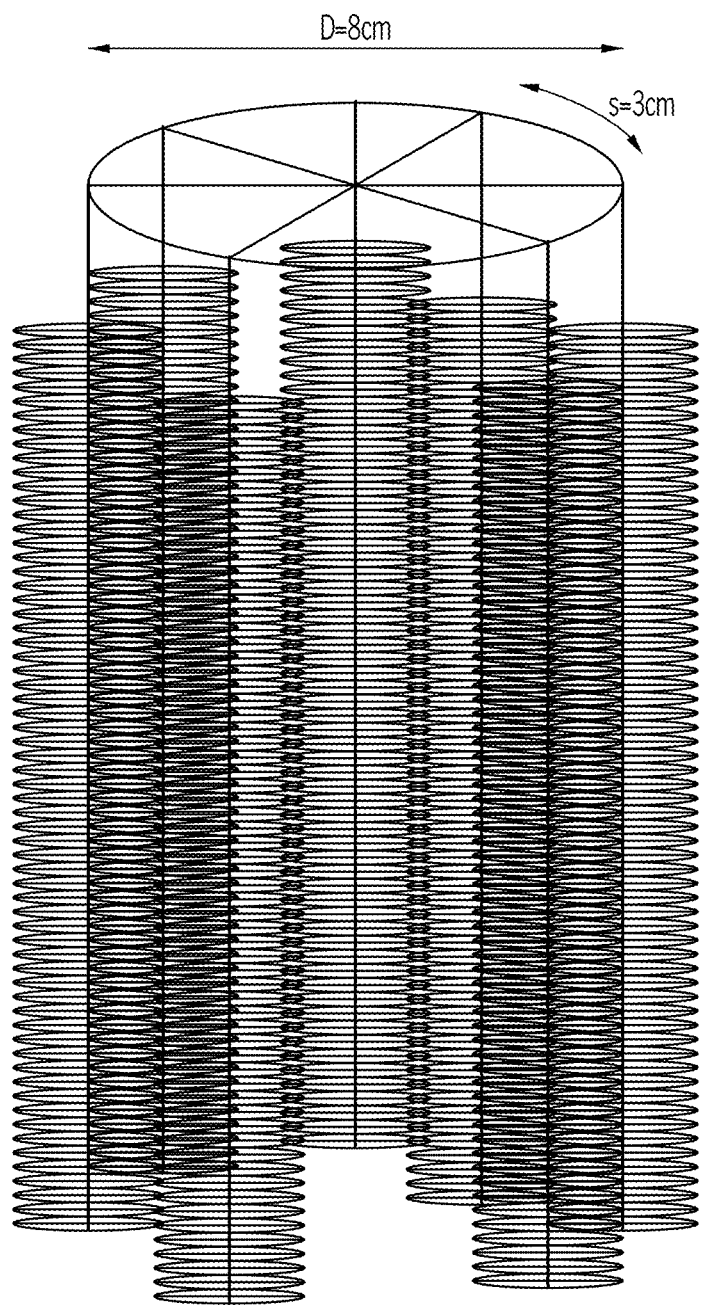
FIG. 1B is a schematic structural diagram of an overall structure of a ring type carbon brush electrode bio-carrier of an embodiment of the present disclosure.

An entire ring type carbon brush electrode bio-carrier module is a cylinder having a diameter of 8 cm and a height of 16 cm in FIG. 1.

Figure 2A:
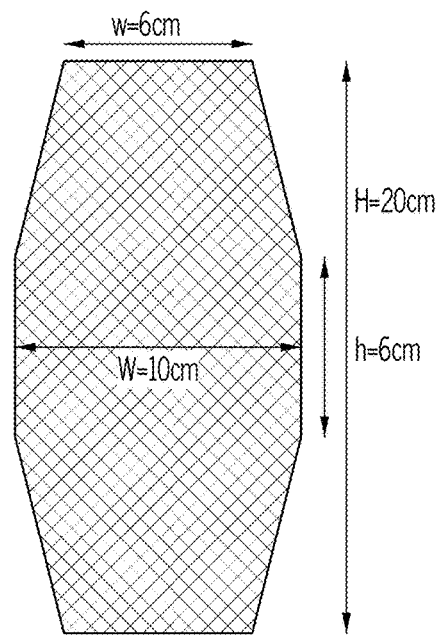
FIG. 2A is a schematic diagram of a cut stainless steel mesh electrode of an embodiment of the present disclosure.
Figure 2B:
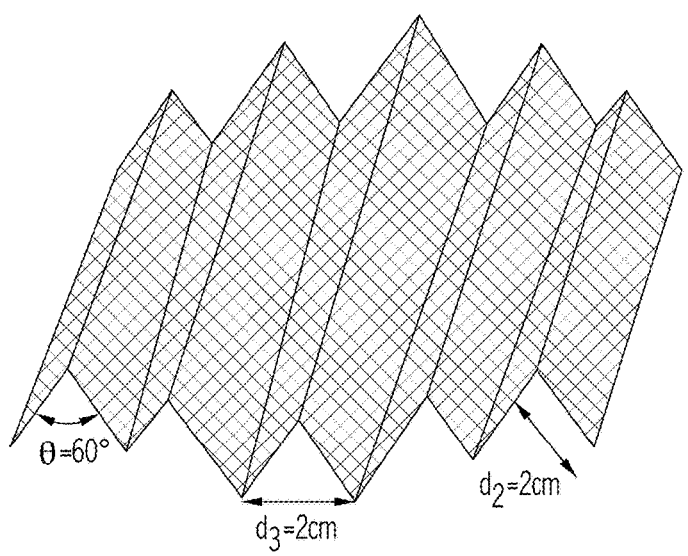
FIG. 2B is a schematic diagram of a corrugated stainless steel mesh of an embodiment of the present disclosure.
Figure 2C:
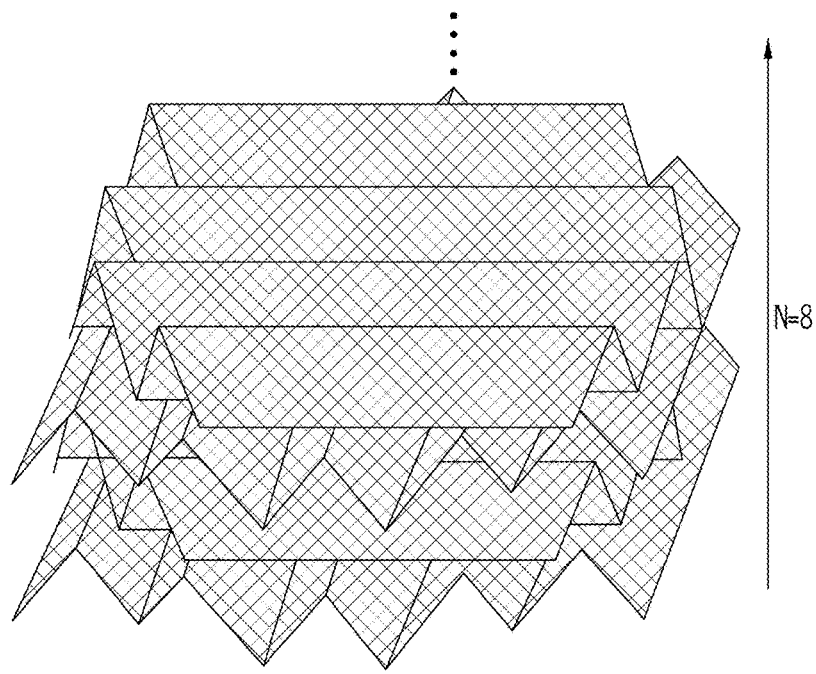
FIG. 2C is a schematic diagram of an overall corrugated stainless steel mesh electrode bio-carrier module formed by stacking corrugated stainless steel meshes of an embodiment of the present disclosure.

In a corrugated stainless steel mesh electrode bio-carrier module: a single layer of stainless steel mesh is corrugated, with a length of 10 cm, a width of 10 cm, and a corrugation clearance of 2 cm, referring to FIGS. 2A-2C. The entire module has a length of 10 cm, a width of 10 cm, and a height of 14 cm.

Figure 3:
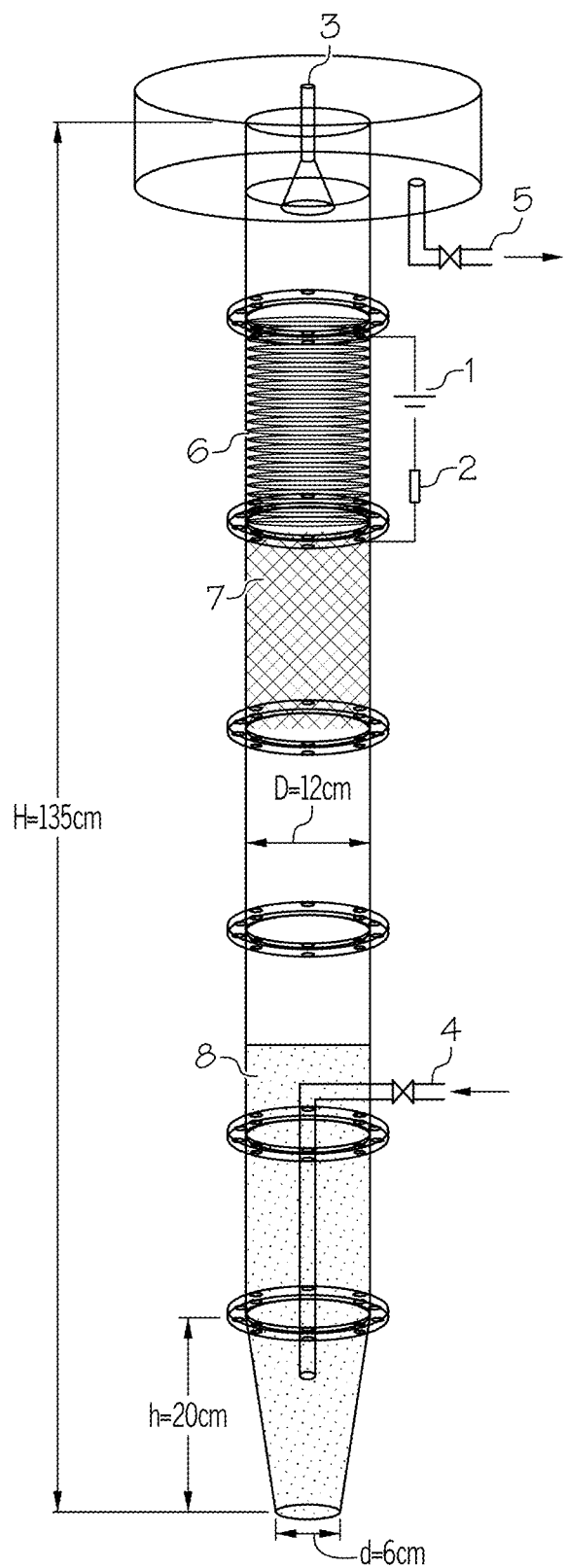
FIG. 3 is a schematic structural diagram of a device with a built-in electroactive bio-carrier module of an embodiment and the present disclosure.

Carbon fiber brushes each having a diameter of 2.5 cm and a length of 16 cm are soaked in hydrochloric acid of 1 mol/L for 24 h, then taken out and flushed with deionized water for 3 times, and dried in air. A first titanium wire and plastic screws are used to connect eight treated carbon fiber brushes in series at an interval of 3 cm, and the first titanium wire is enclosed end to end to form a ring having a diameter of 8 cm; one carbon fiber brush is fixed in the center of the ring, thereby forming the ring type carbon brush electrode module. A 304 stainless steel mesh with an aperture specification of 24 meshes and a wire diameter of 0.21 mm is cut into eight stainless steel meshes shown in FIG. 2A; the cut stainless steel meshes are folded into a corrugated shape, with an angle of 60 degrees; a single fold has a height of 2 cm; a second titanium wire is used to stack and serially connect the eight layers of bent stainless steel meshes in parallel, thereby forming a folded stainless steel mesh electrode module. The prepared ring type carbon brush electrode module is arranged in the center of a second cylinder of an anaerobic bioreactor from top to bottom. The prepared folded stainless steel mesh electrode module is arranged in the center of a third cylinder of the anaerobic bioreactor from top to bottom. The two electrode modules are connected with an external power supply, an external resistor, and a data acquisition machine via lead wires to form a loop (the 8 cm long titanium wire extends to the outside of the device through a reserved hole and is used as a current collector). There is no external voltage in this embodiment. After the reactor is constructed, tracer experiments are performed respectively under different HRT (Hydraulic Retention Time) (12 h, 8 h, 6 h, and 4 h) conditions, and time-varying curves and retention time distribution curves are drawn according to a tracer. Meanwhile, the reactor is subjected to flow state simulation through a Fluent module in simulation software ANSYS.2020.R2. Reference numerals in FIG. 3 are as follows: 1. External power supply; 2.

External resistor; 3. Three-phase separator; 4. Water inlet; 5. Water outlet; 6. Cathode bio-carrier module; 7. Anode bio-carrier module; 8. Anaerobic sludge area.

Comparative Example

In order to highlight the optimization effect of the introduction of the electroactive bio-carrier module on the flow state of fluid, the reactor is compared with an anaerobic bioreactor without an electroactive bio-carrier module (i.e., the second cylinder and the third cylinder are not provided with the above-mentioned electroactive bio-carrier module). The comparative example and Embodiment 1 are operated under the same conditions; hydraulic retention time distribution experiments are performed respectively under different hydraulic retention time (HRT=12 h, 8 h, 6 h, and 4 h) conditions, so as to obtain differences between actual HRT and theoretical HRT.

The dimensionless time θ based on a flow rate replaces actual time t to normalize an RTD (hydraulic retention time distribution) curve; an RTD relational curve between θ and a normalized liquid age E(θ) is established; a stretching or compression effect of a flow rate change on an RTD horizontal axis or longitudinal axis under an unsteady condition is eliminated; and therefore, RTD curves under different hydraulic loads are comparative. Experimental results show that under the condition of theoretical HRT=6 h, 4 h, and 2 h, the obtained RTD curves are all unimodal curves and asymmetric, and are approximate to a positively skewed long tail clock-shaped distribution feature; the peak of the normalized curve increases as the HRT decreases.

Figure 4:
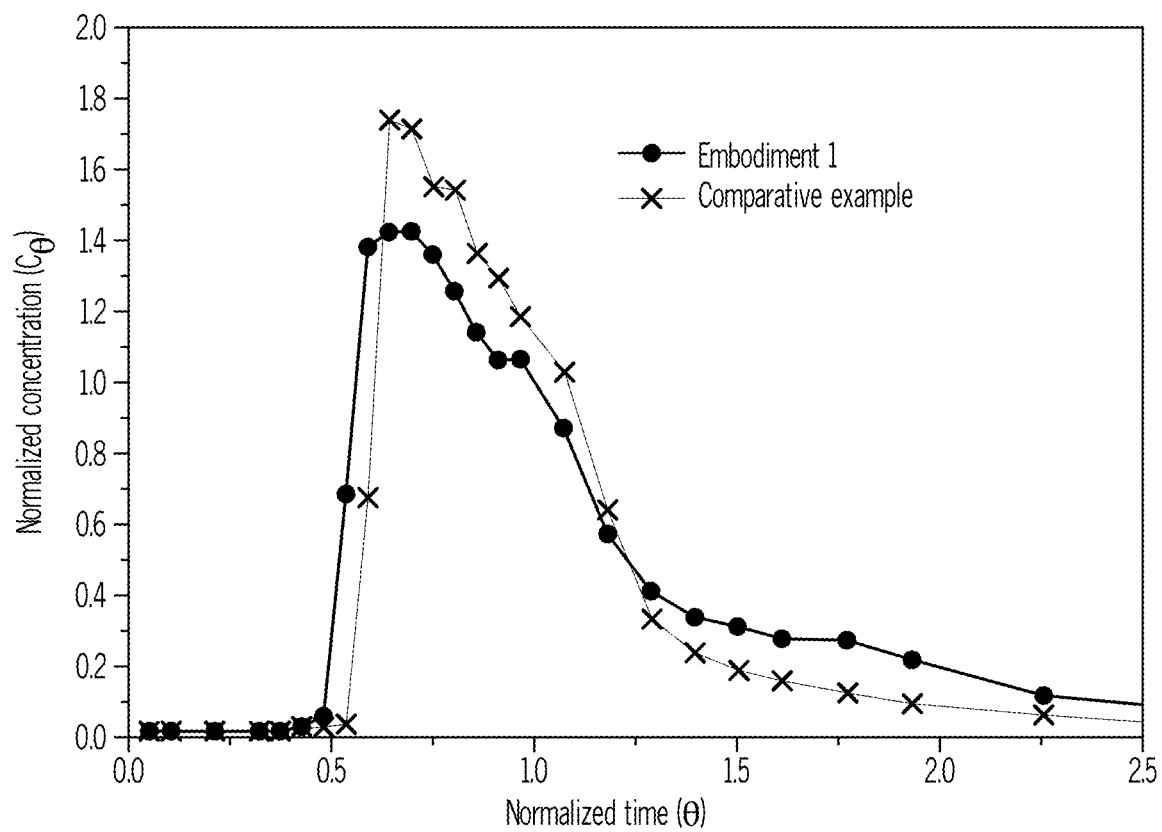
FIG. 4 is a comparison diagram of actual retention time of an embodiment of the present disclosure.

FIG. 4 is a retention time distribution curve of the reactor in the embodiment of the present disclosure. The retention time distribution curve obtained in Embodiment 1 has a lower peak when compared to the retention time distribution curve obtained in the comparative example; the peak of the comparative example is 1.742 while the peak of Embodiment 1 is 1.427, which indicates that the tracer quickly and intensively flows out in the comparative example, but slowly and uniformly flows out in Embodiment 1. The actual retention time/theoretical retention time obtained in Embodiment 1 is longer than that of the comparative example. When the theoretical HRT is 2 h, the actual retention times/theoretical retention times of Embodiment 1 and the comparative example are respectively 1.675 and 1.552. When the theoretical HRT is 4 h, the actual retention times/theoretical retention times of Embodiment 1 and the comparative example are respectively 2.073 and 1.668. When the theoretical HRT is 6 h, the actual retention times/theoretical retention times of Embodiment 1 and the comparative example are respectively 1.896 and 1.683. These show that the introduction of the electrode carrier prolongs the retention time of pollutants and effectively reduces adverse hydraulic phenomena such as short flow and retention, and the like, so that the pollutants and sludge better contact the surface of the electrode, and then the pollutant removal efficiency is improved.

On the basis of the RTD experiments, the flow state feature of the device is visually characterized through computational fluid dynamics (CFD) simulation. A computational simulation on devices equipped with different electrode bio-carriers is performed by using a Fluent module, a Geometry module, and a Mesh module of the ANSYS software, and employing an RNG k-ε model. Results in the pressure distribution cloud diagram of an axial surface in the reactor show that the internal maximum pressure $P_{max\text{-}3}$=0.004 Pa of the comparison group changes slowly. After the electrode carrier is introduced, the internal pressure of the device in the embodiment group 1 significantly increases from a water inlet area to the electrode carrier area, and the pressure changes quickly with the height in a vertical direction, which is increased by 1.5 to 3 times. This shows that the introduction of the electrode carrier can change gas-liquid partial pressures inside the device, reduce the thickness of a mass transfer boundary layer, and promotes mass transfer of the pollutants in a liquid phase; and the "ring type carbon brush electrode bio-carrier" has a larger density, which affects the pressure more obviously.

The flow state of the electrode carrier area is further characterized through a flow velocity distribution cloud diagram and a trace diagram. A simulation result of a local flow velocity of the electrode module shows that in the comparison group, the flow velocity in the center of the device is the maximum and vertically decreases from the central axis to the wall surface, and this is a typical pipe flow feature; the flow velocity in the electrode carrier area is just to the contrary; the flow velocity at a gap between the electrode and the wall surface is high, but the flow velocity in the center area of the device is low; the flow velocity in the "ring type carbon brush electrode bio-carrier" area is reduced by 75%, and the flow velocity in the "corrugated stainless steel mesh stacked electrode bio-carrier" area is reduced by 50%; both the flow velocities are uniformly distributed along a cross section of the device. This also proves that the introduction of the electrode carrier plays a role of secondary water distribution, effectively reduces short flow and dead zones, and prolongs the contact time of the pollutants in the electrode area with the surface of the electrode and microorganisms.

The specific embodiments described above further describe the purposes, technical solutions and beneficial effects of the present disclosure in further detail. It should be understood that the above descriptions are only specific embodiments of the present disclosure and are not intended to limit the present disclosure. Any modifications, equivalent replacements, improvements, etc. made within the spirit and principle of the present disclosure should fall within the protection scope of the present disclosure.

What is claimed is:

1. An electroactive bio-carrier module, comprising:
   (1) a circular-distributed carbon brush electrode bio-carrier module,
   wherein the circular-distributed carbon brush electrode bio-carrier module is formed by combining a plurality of carbon brushes; each carbon brush having a diameter of 1.5-3.0 cm and a length of 10-30 cm;
     the carbon brushes are configured to be soaked in hydrochloric acid and then dried in air after impurities are removed from surfaces of the carbon brushes; a first titanium wire and plastic screws are used to connect the plurality of carbon brushes treated in series to the first titanium wire at an interval of 20-50 mm; one end, i.e. an upper end, of each carbon brush is fixed to the first titanium wire; the first titanium wire is enclosed end to end to form a ring, and a carbon brush is fixed at a center of the ring; the circular-distributed carbon brush electrode bio-carrier module in whole is of a cylindrical structure formed by the carbon brushes axially disposed in parallel;
   (2) a corrugated stainless steel mesh electrode bio-carrier module,
   the corrugated stainless steel mesh electrode bio-carrier module is formed by combining a plurality of corrugated stainless steel meshes stacked in parallel; lengthwise directions of corrugations of adjacent upper and lower corrugated stainless steel meshes are perpendicular to each other; one layer and another layer of the adjacent upper and lower corrugated stainless steel meshes are fixedly connected via a second titanium wire.

2. The electroactive bio-carrier module according to claim 1, wherein (1) in the circular-distributed carbon brush electrode bio-carrier module; the cylindrical structure has a diameter of 8 cm and a height of 16 cm; and (2) in the corrugated stainless steel mesh electrode bio-carrier module, an included angle at a wave crest or wave trough of each corrugated stainless steel mesh is 60 degrees; a distance between two adjacent wave crests or wave troughs is 2 cm; the corrugated stainless steel mesh electrode bio-carrier module in whole has a length of 10 cm, a width of 10 cm, and a height of 14 cm.

3. A sewage treatment device with built-in electroactive bio-carrier modules composed of the electroactive bio-carrier module according to claim 1, comprising a main body formed by axially connecting one cone and six cylinders in series; the cone is located at a bottom of the main body; wherein the main body is made of an insulating material; from top to bottom, a first cylinder of the six cylinders is provided with a three-phase separator and a water outlet, a second cylinder of the six cylinders is filled with the circular-distributed carbon brush electrode bio-carrier module as an anode module, a third cylinder of the six cylinders is filled with the corrugated stainless steel mesh electrode bio-carrier module as a cathode module; the cathode module and the anode module are connected with an external power supply, an external resistor, and a data acquisition machine to form a loop; a fifth cylinder of the six cylinders, a sixth cylinder of the six cylinders, and the cone at the bottom form an anaerobic sludge area which is provided with a water inlet.

4. The sewage treatment device according to claim 3, wherein the sewage treatment device is configured to be applied or not applied an external voltage during an operation of the sewage treatment device.

5. The sewage treatment device according to claim 4, wherein the sewage treatment device is configured to be applied an external voltage less than 1 V.

6. The sewage treatment device according to claim 3, wherein the plurality of carbon fiber brushes and the plurality of corrugated stainless steel meshes are connected in series via a third titanium wire, and the third titanium wire is configured as a current collector.

7. The sewage treatment device according to claim 3, wherein each stainless steel mesh is made of 304 stainless steel mesh material of 24 meshes.

8. The sewage treatment device according to claim 3, wherein the sewage treatment device is configured for use in an up-flow process; surfaces of the anode module and the cathode module are configured to enrich electroactive biofilms; and the cone and the cylinders are of non-conductive materials.

9. The sewage treatment device according to claim 3, wherein the anode module and the cathode module are configured to distribute secondary water to prolong actual hydraulic retention time.

10. The sewage treatment device according to claim 3, wherein the sewage treatment device is sealed and configured for use in an anaerobic biological process.

11. A sewage treatment device with built-in electroactive bio-carrier modules composed of the electroactive bio-carrier module according to claim 2, comprising a main body formed by axially connecting one cone and six cylinders in series; the cone is located at a bottom of the main body; wherein the main body is made of an insulating material; from top to bottom, a first cylinder of the six cylinders is provided with a three-phase separator and a water outlet, a second cylinder of the six cylinders is filled with the circular-distributed carbon brush electrode bio-carrier module as an anode module, a third cylinder of the six cylinders is filled with the corrugated stainless steel mesh electrode bio-carrier module as a cathode module; the cathode module and the anode module are connected with an external power supply, an external resistor, and a data acquisition machine to form a loop; a fifth cylinder of the six cylinders, a sixth cylinder of the six cylinders, and the cone at the bottom form an anaerobic sludge area which is provided with a water inlet.

* * * * *